July 12, 1966 P. THEVIS 3,260,452
APPARATUS FOR REDUCING THE NUMBER OF DIVIDING
MOVEMENTS OF A CALCULATOR
Filed Sept. 27, 1965 6 Sheets-Sheet 1

INVENTOR
Paul Thevis
BY: Michael S. Striker
ATTORNEY

INVENTOR
BY: Paul Thevis
Michael S. Striker
ATTORNEY

July 12, 1966

P. THEVIS 3,260,452

APPARATUS FOR REDUCING THE NUMBER OF DIVIDING
MOVEMENTS OF A CALCULATOR

Filed Sept. 27, 1965

INVENTOR
Paul Thevis
BY: Michael S. Striker
ATTORNEY

United States Patent Office

3,260,452
Patented July 12, 1966

3,260,452
APPARATUS FOR REDUCING THE NUMBER OF DIVIDING MOVEMENTS OF A CALCULATOR
Paul Thevis, Oberndorf (Neckar), Germany, assignor to Olympia Werke AG, Wilhelmshaven, Germany
Filed Sept. 27, 1965, Ser. No. 490,268
Claims priority, application Germany, Apr. 3, 1965, O 10,764
20 Claims. (Cl. 235—63)

The present invention relates to an apparatus for reducing the number of dividing movements of a calculator, and more particularly to apparatus for preventing the input storage means of a ten-key calculator to move to its end position during dividing operations with a dividend having a limited number of orders.

In a calculator of the type with which the present invention is concerned, a division is carried out by entering the dividend into an input storage means, such as a pin carriage, transferring the dividend into a counter, entering the divisor into the input storage device, and carrying out the division by repeated subtractions of the divisor from the dividend.

During entry of the dividend and of the divisor the input storage device moves between ordinal positions stepwise toward the left. Before the divisor is entered, the input storage device is returned to its initial position. After the entry of a divisor, the division key is actuated, whereupon the input storage device moves to its highest order position and starting from this position, the divisor is repeatedly subtracted from the dividend starting with the highest order and gradually progressing towards the lower orders so that the input storage device moves to the highest order position at the start of dividing operations.

This standard dividing operation has the disadvantage that, particularly if the dividend has a small number of orders, many machine movements are unnecessarily carried out, since even in orders, in which no numerical value is stored, a negative and a positive operation must take place.

It has been proposed to overcome these disadvantages by providing a tabulating key in each order so that upon actuation of a tabulator key, the movement of the input storage device towards its end position is stopped in an intermediate ordinal position. This construction requires an additional key and an additional operation, and a consideration of the order numbers of the numbers involved in the problem by the operating person.

In accordance with another construction of the prior art, the input storage device, and more particularly the pin carriage, is controlled to drive to the exact ordinal position which corresponds to the order number of the dividend stored in the counter. This is accomplished by setting an adjustable stop upon the entry of the dividend under control of the division key which requires a very complicated mechanism and additional actuations of the division key in a different manner than in standard calculators. However, since dividends having extremely high order numbers very rarely occur in divisions carried out in the usual office practice, the addition of such a rather complicated mechanism to a standard calculator is not justified.

It is one object of the invention to overcome the disadvantages of known apparatus for reducing the number of dividing motions of an input storage device, and to eliminate unnecessary dividing movements of the input storage device by very simple means.

It is the principal object of the invention to permit dividing movements of the input storage device to its highest ordinal position only if the number of orders of the divisor exceeds a selected predetermined number of orders.

This order number is selected in relation to the highest number of orders for which the calculator is designed. For example, if a division is to be carried out with eleven orders, the input storage device into which the divisor has been entered, is stopped in the seventh order position for dividends up to six orders. Consequently, if a dividend has not more than six orders, the input storage device, and more particularly the pin carriage of a ten key calculator, is prevented from moving to the highest order position, and is stopped in the seventh order position and starts from there with the dividing operations during which the divisor is repeatedly subtracted from the dividend order by order.

If the dividend has seven or more orders, the pin carriage with the divisor entered therein, is permitted to move to the highest order before starting the successive dividing operations. Since dividends having such a high number of orders do not occur very frequently in the usual office practice, the time required for divisions with high dividends is immaterial.

A particular advantage of the invention is the simple construction of the apparatus which is due to the fact that the input storage device is either stopped or not stopped in one selected ordinal position, and that the decision whether the dividing operations are to be simplified or not, is not made by the operator, but by the machine which automatically performs different operations for dividends having a high, or a low number of orders.

One embodiment of the invention comprises input storage means, such as a pin carriage which is operable to successively move to ordinal positions upon entry of a number; stop means for stopping the input storage means in an intermediate ordinal position; a division key for moving the stop means to the stop position and for starting dividing operations during which the input storage means moves between ordinal positions; and coupling means having a normal coupling position for connecting the division key with the stop means, and an inoperative position. The coupling means has a part located in the path of movement of the input storage means in the region of the intermediate ordinal position and of the stop means so that the coupling means are moved to an inoperative position by the input storage means arriving at the intermediate ordinal position during entry of a dividend having at least the number of orders represented by the intermediate ordinal position. Consequently, operation of the division key will cause movement of the stop means to the stop position, and stopping of the input storage means in the intermediate ordinal position during dividing operations, only if the dividend entered into the input storage means has a smaller number of orders than represented by the input storage means in the intermediate ordinal position.

In the preferred embodiment of the invention, the stop means includes a stop lever pivotally mounted on the coupling means and having a portion cooperating with the division key only when the coupling means is in the coupling position.

When at the end of the division, the total key is actuated, all parts of the device are automatically returned to the initial normal position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
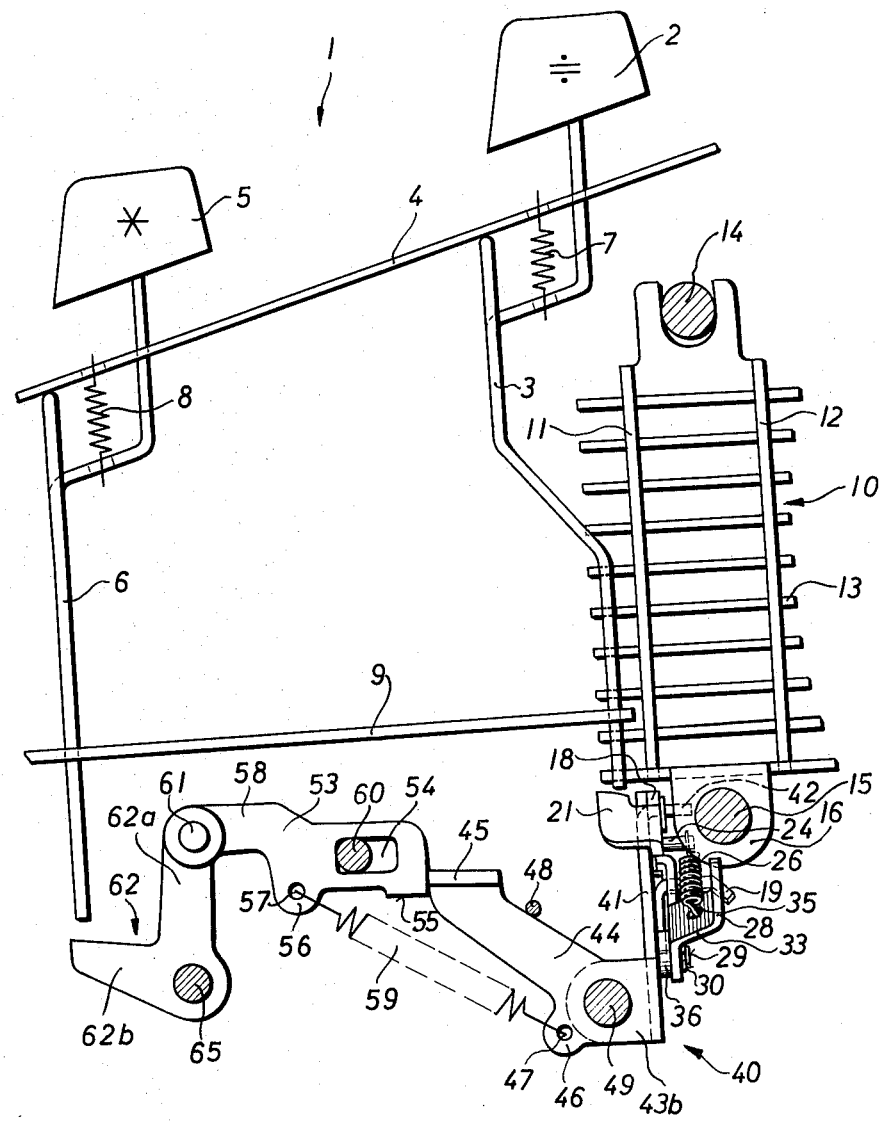
FIG. 1 is a fragmentary side view of one embodiment of the invention, with conventional calculator parts omitted for the sake of simplicity.

Referring now to the drawings, and more particularly to FIG. 1, the stems 3 and 6 of a division key 2 and a total key 5 pass through openings in a cover plate 4 and are biased by springs 7 and 8 to a normal inoperative position. Keys 2 and 5 are part of the keyboard of a standard ten key calculator which includes ten digit keys, not shown. A bottom plate 9 is mounted on the frame of the machine and has openings for guiding the stems of the keys.

An input storage means in the form of a pin carriage 10 has a pair of side walls 11 and 12 between which ordinal rows of digit pins are mounted shiftable between inoperative positions and displaced positions representing a digit in the respective order. Pin carriage 10 is mounted on a pair of guide rails 15 and 14 for movement between successive ordinal positions, and has brackets 16 through which guide rail 15 passes. The conventional connections between the digit keys and the pins of the pin carriage 10, and the ordinal transfer elements for sensing the number representing pins 13 and for transferring the respective number stored in the pin carriage to a counter or totalizer, are not shown in FIG. 1 for the sake of simplicity.

Figure 2:
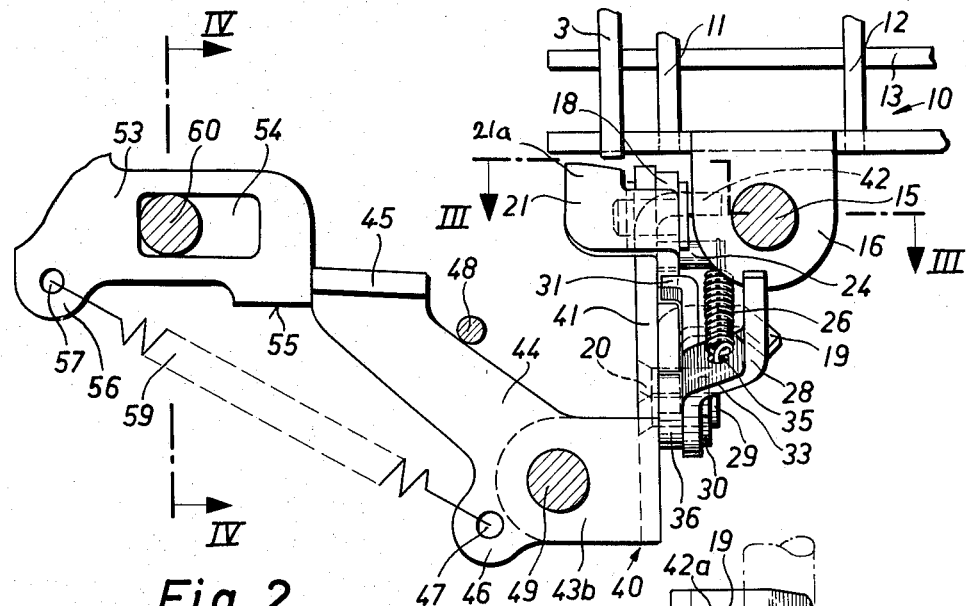
FIG. 2 is a fragmentary side elevation illustrating a part of FIG. 1 on an enlarged scale.
Figure 3:
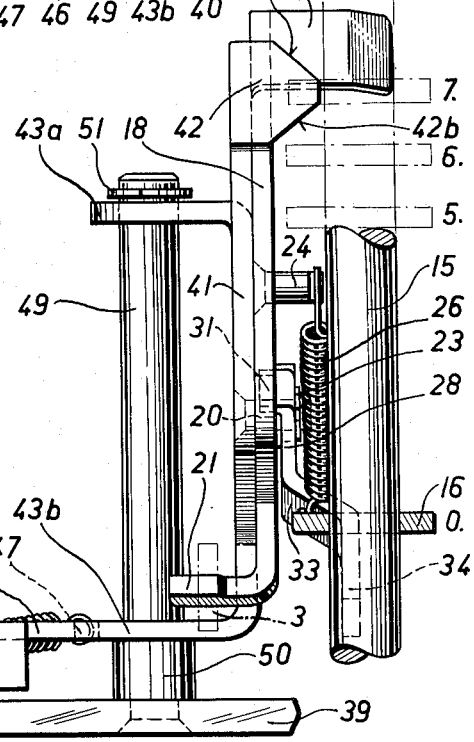
FIG. 3 is a plan view of the apparatus shown in FIG. 2, partially in section along line III—III.
Figure 4:
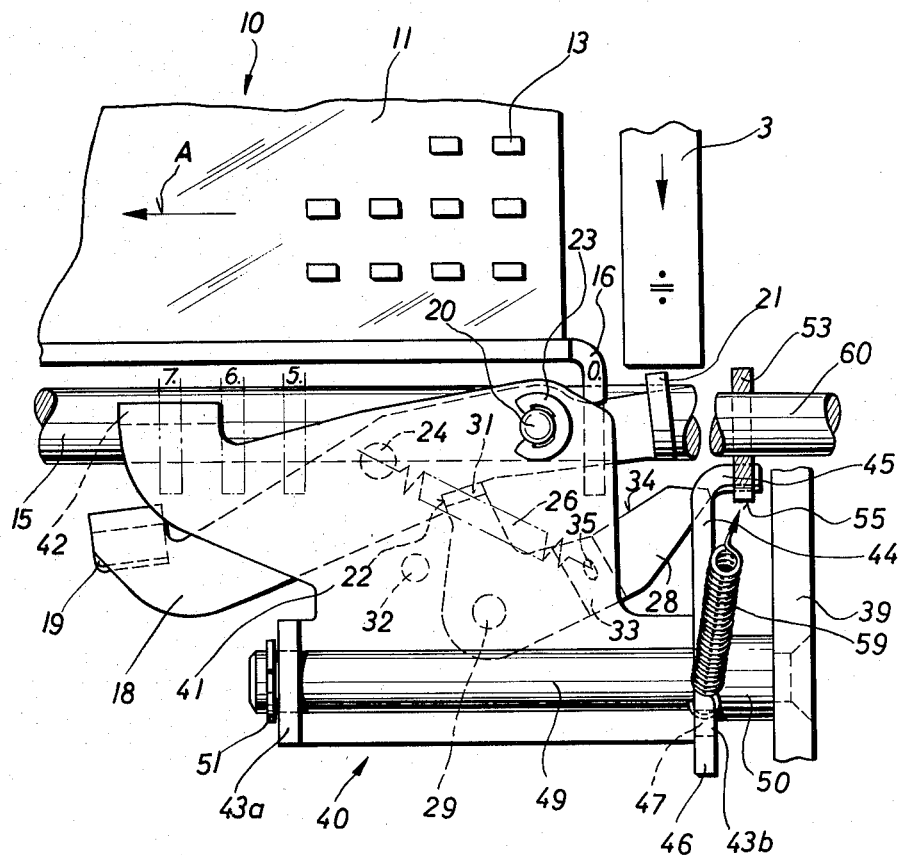
FIG. 4 is a front view, partially in section taken on line IV—IV in FIG. 2.

The apparatus of the invention is shown in its normal initial position in FIG. 1, and on an enlarged scale in FIGS. 2, 3 and 4. As shown in FIG. 4, bracket 16 of pin carriage 10 has an initial position indicated by 0, and is movable to the left in the direction of the arrow A to successive ordinal positions of which the fifth, sixth and seventh ordinal positions are indicated by chain lines representing corresponding positions of bracket 16. Stop means are provided for stopping pin carriage 10 in the seventh ordinal position by engaging bracket 16 when the pin carriage arrives in the seventh ordinal position.

The stop means includes a stop lever 18 mounted for angular movement on a pivot pin 20 carried by the wall 41 of a coupling means 40 and secured to the same by a spring ring 23. Stop lever 18 has at one end a transverse projection 21 with an abutment face located under stem 3 of division key 2. Consequently, operation of division key 2 will cause angular displacement of stop lever 18 in clockwise direction as viewed in FIG. 4 to a position in which a stop projection 19 at the other end thereof is located in the path of movement of bracket 16 when pin carriage 10 is in its seventh ordinal position. FIG. 4 shows stop lever 18 in its normal inoperative position located below the path of bracket 16 along guide rail 15.

As best seen in FIG. 4, the lower edge of stop lever 18 has an arresting shoulder 22.

An arresting catch 28 in the form of an angular lever is mounted for angular displacement on a pivot pin 29 carried by wall 41 of coupling means 40. A spring 26 has one end secured to a pin 24 carried by stop lever 18, and the other end secured to a hole 35 in arresting catch 28 so that the same is urged to turn in counterclockwise direction as viewed in FIG. 4. A spacing ring 36 is provided between wall 41 and arresting catch 28 and a spring ring 30 secures arresting catch 28 to pivot pin 29.

When stop lever 18 is turned out of the position illustrated in FIG. 4, to the position illustrated in FIG. 8, as will be explained hereinafter in greater detail, arresting shoulder 22 releases the engaging portion 31 to catch 28 which is turned by spring 26 to a position resting on an abutment pin 32 on wall 41. In this position, a camming edge 34 of arresting catch 28 is located in the path of movement of bracket 16 of pin carriage 10 so that bracket 16 turns arresting catch 28 in clockwise direction out of the position of FIG. 8 to the arresting position shown in FIG. 4 when the pin carriage travels to the right as viewed in FIGS. 4 and 8.

As explained above, stop lever 18 and arresting catch 28 are mounted on the wall 41 of a coupling means 40 which includes a pair of bearing brackets 43a and 43b mounted for turning movement on a stationary shaft 49 and secured to the same by a spring ring 51. Shaft 49 is secured to a side wall 39 of the calculator frame, and bearing bracket 43b is spaced by a ring 50 from wall 39. A control portion 42 projects transversely from wall 41 in the region of stop portion 19 of stop lever 18, which is also the region in which bracket 16 is located when pin carriage 10 is in the seventh ordinal position. Control portion 42 has two slanted camming faces 42a and 42b which are slanted to each other and to the direction of movement of pin carriage 10 with bracket 16.

The fifth, sixth and seventh ordinal positions of bracket 16 of pin carriage 10 are indicated in chain lines in FIG. 3, and it is evident that bracket 16 will engage camming face 42b during movement of the pin carriage from the sixth to the seventh ordinal position under the action of a spring, not shown, so that a force will act on control portion 42 to the left as viewed in FIG. 3 and above the turning axis of coupling means 40 defined by shaft 49 so that the coupling means 40 will be urged to turn in counterclockwise direction as viewed in FIG. 2.

Coupling means 40, and more particularly varying bracket 43b has an arm 44 ending in a transverse locking portion 45 cooperating with a locking member 53, and connected with the same by a spring 59 hooked into openings 47 and 57 and urging coupling means 40 to the normal position illustrated in FIGS. 1 and 2 abutting a stop 48 so that projection 21a of stop lever 18 is located under stem 3 of the division key 2.

Locking means 53 has a rectangular cutout 54 in which a supporting pin 60 is located. In the initial position of the apparatus, locking portion 45 abuts a lateral edge of locking means 53, but if coupling means 40 is turned in counterclockwise direction as viewed in FIG. 2, locking portion 45 will be located below a locking abutment 55 and locked by the same in an angularly displaced position shown in FIG. 5.

As shown in FIG. 1, locking member 53, which is shown broken off in FIG. 2, has an arm 58 connected by a pivot pin 61 to the arm 62a of an angular lever 62 mounted on a pivot 65 and having an arm 62b located under the stem 6 of the total key 5.

Figure 7:
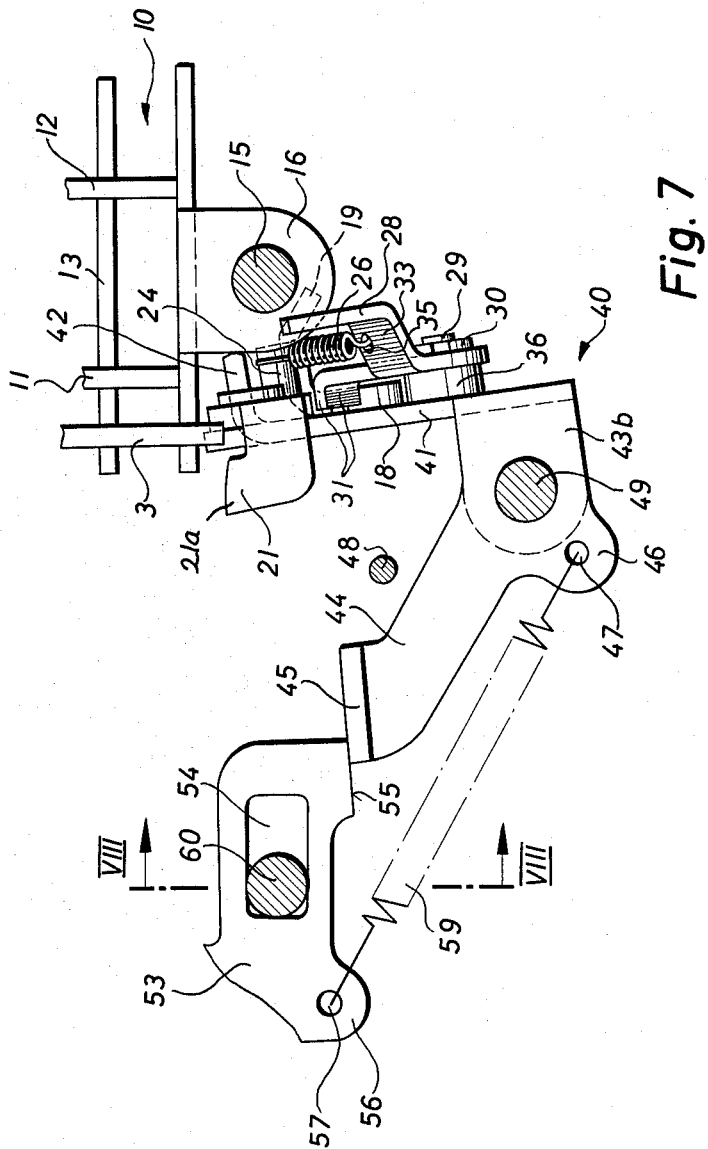
FIG. 7 is a fragmentary side elevation corresponding to FIG. 2 but illustrating another operational position of the apparatus during the entry of a dividend having a number of orders smaller than the selected predetermined number of orders.

If total key 5 is actuated in the position of blocking member 53 and coupling means 40 shown in FIG. 7, angular lever 62 is turned in counterclockwise direction and shifts blocking member 53 to the left as viewed in FIG. 7 so that portion 45 is released by abutment 55 so that spring 59 moves locking means 53 and coupling means 40 back to the initial position shown in FIG. 2. Consequently, lever 62 serves as a releasing means for releasing coupling means 40 to return to the normal coupling position shown in FIG. 2 in which stem 3 of division key 2 is located opposite coupling portion 21a of projection 21 of stop lever 18 and operatively coupled with the same, so that the division key can turn stop lever 18 to a stop position in which stop portion 19 is located in the path of movement of bracket 16, as shown in FIG. 8.

Figure 5:
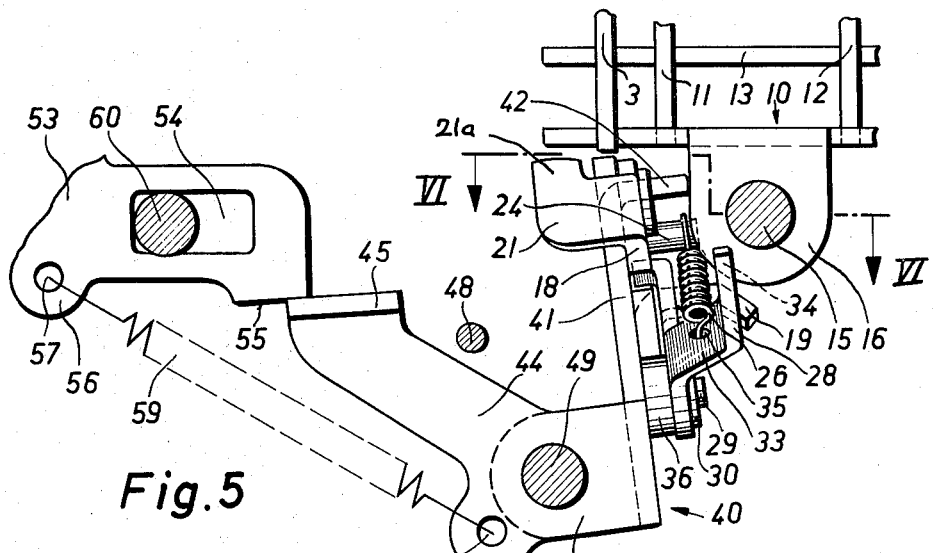
FIG. 5 is a side elevation corresponding to FIG. 2 but illustrating a first operational position during the entry of a dividend having at least a predetermined selected number of orders.

In the locked position of coupling means 40 shown in FIG. 5, the coupling means is inoperative, and division key 2 is not coupled with stop lever 18 since stem 3 is not located opposite the higher coupling portion 21a of projection 21 so that downward movement of stem 3 has no effect on stop lever 18.

*Operation*

In the standard ten key calculator of the type with which the present invention is concerned, a division is carried out by entering the dividend into the pin carriage 10 by operation of digit keys, not shown, whereupon the dividend is transferred into a counter or storage device by an ordinal set of transfer members. The pin carriage is returned to its initial position, and the devisor is entered into the pin carriage by operation of the digit keys. Apparatus which can be used for this purpose is, for example, disclosed in my copending applications Serial No. 452,026 and 452,027.

During the entry of the digits of successive orders into the pin carriage, the same moves stepwise in the direction of the arrow in FIG. 4 so that bracket 16 moves from the initial 0 position to successive ordinal positions of which the fifth, sixth and seventh positions are indicated by chain lines.

Figure 6:
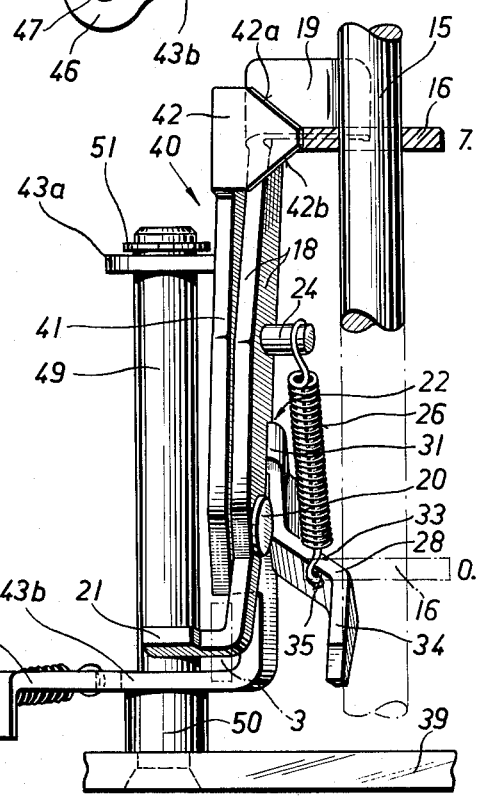
FIG. 6 is a fragmentary plan view of the apparatus shown in FIG. 5.

Assuming that a dividend is being entered into the pin carriage which has more orders than seven, bracket 16 engages during the step of pin carriage 10 from the sixth order position to the seventh order position, the camming face 42b of control portion 42 of coupling means 14 as is apparent from FIG. 3 so that coupling means 40 is turned about shaft 49 to the angularly displaced position shown in FIG. 5 and FIG. 6. When pin carriage 10 has completed the step to the seventh ordinal position, a lateral face of bracket 16 rests on a flat abutment face of control portion 42 as shown in FIG. 6. Stop means 18, 19, 21, 21a turns with coupling means 40 since it is mounted on wall 41 by pivot pin 20. Consequently, coupling portion 21a is no longer located opposite stem 3 of division key 2 so that operation of the same will not cause engagement between stem 3 and stop lever 18.

During turning of coupling means 40 from the coupling position of FIG. 2 to the inoperative position shown in FIGS. 5 and 6, locking means 53 was momentarily displaced to the left as view in the drawing against the action of spring 59 since locking portion moves along a circular path having its center in the axis of shaft 49. When the top face of locking portion 45 is located below abutment 55, locking means 43 moves again to the right under the action of spring 59 and engages the top face of locking portion 45 to hold and lock coupling means 40 in the inoperative position of FIG. 5.

In the normal inoperative position of stop means 18, 21, 21a, 19, stop portion 19 is not located in the path of movement of bracket 16, as is apparent from FIGS. 2, 4 and 5, and pin carriage 10 can continue its movement to higher ordinal position. After the dividend has been transferred to a counter, not shown, it is returned to its initial position, and the divisor entered into the same. Since stop means 18, 21, 19 is not located in the path of movement of bracket 16 in the locked inoperative position of coupling means 40, the pin carriage is free to move beyond the seventh ordinal position. When the division key 2 is now actuated, the usual dividing operations are started during which the pin carriage moves to the highest ordinal position, and then subtracts the divisor order by order from the dividend stored in the counter.

Therefore, if the dividend has a greater number of orders than seven, or other selected order intermediate the highest order and the unit order of the calculator, the division is carried out in the same manner as in a standard ten key calculator.

At the ends of the division the total key 5 is depressed so that stem 6 enages arm 62b of releasing lever 62, see FIG. 1, which is turned to pull locking means 53 to the left as viewed in FIG. 5 so that locking portion 45 is released by abutment 55 and spring 59 turns coupling means 40 to the normal operative position shown in FIG. 2 in which locking portion 45 abuts a lateral edge of locking means 53 and arm 44 abuts stop 48.

Assuming now that a division is to be carried out with a dividend having fewer orders than seven, for example six orders, the pin carriage moves six steps when the six ordinal digits are entered by operation of the digit keys. When the pin carriage is in the sixth ordinal position, bracket 6 is still located spaced from control portion 42 of coupling means 40 as shown in FIG. 3, and coupling means 40 remains in the position shown in FIG. 2 in which stem 3 is located opposite coupling portion 21a of stop means 21, 18, 19, so that division key 2 is operatively connected with the stop means which is still in its inoperative position located below the path of movement of bracket 16.

Figure 8:
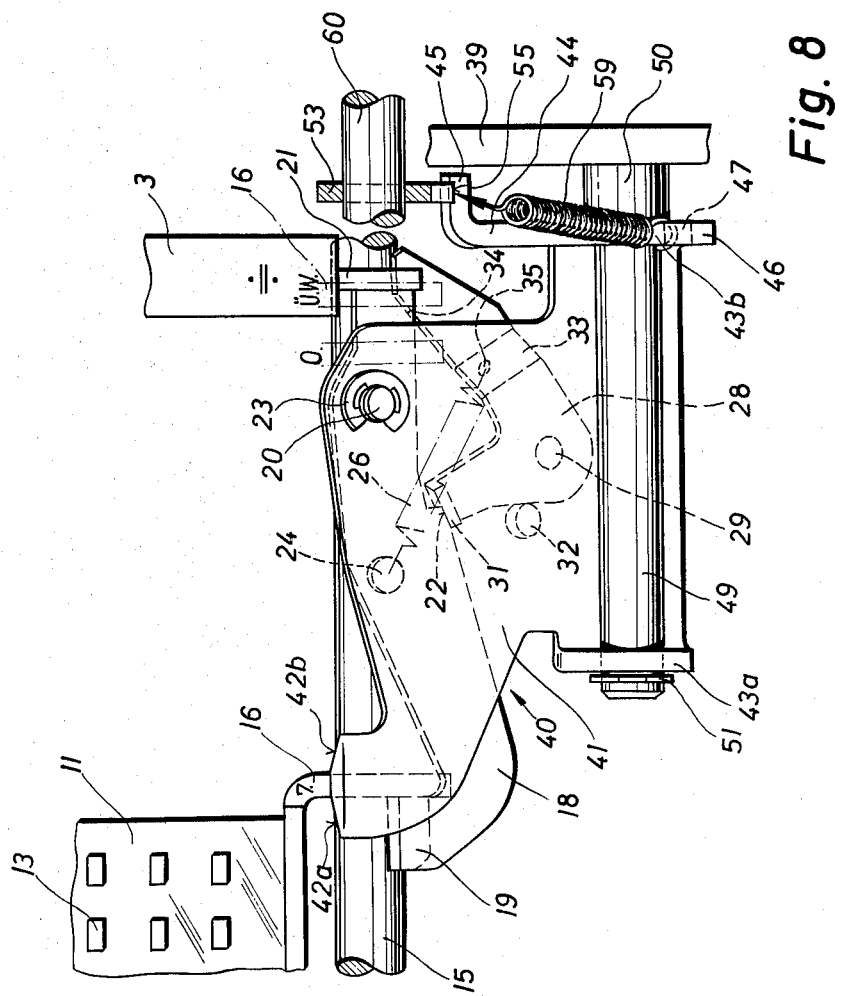
FIG. 8 is a front view of the apparatus shown in FIG. 7, partly in section along line VIII—VIII in FIG. 7.

After the pin carriage has been returned to its initial position and the divisor entered by operation of the digit keys, the division key 2 is operated, and since stem 3 is located opposite coupling portion 21a, stop lever 18 is turned about pivot 20 so that stop portion 19 is raised to the stop position shown in FIG. 8 in which it is located in the path of movement of bracket 16, and blocks the same to stop the pin carriage in the seventh order position.

The clockwise turning movement of stop lever 18 by division key 2 and stem 3, causes release of arresting portion 31 of catch 28 by arresting shoulder 22 of stop lever 18 so that spring 26 turns catch 28 from the position shown in FIG. 4 to the position shown in FIG. 8 in which catch 28 abuts stop 32 on wall 41 of coupling means 40. Camming edge 34 of catch 28 is raised to the position shown in FIG. 8 in which it is located in the path of the return movement of bracket 16 with pin carriage 10. Locking means 18, 21, 19 is locked in this stop position, since portion 31 of catch 28 abuts the lower edge of locking lever 18 in the stop position shown in FIG. 8 so that spring 26 cannot restore the initial position.

Operation of the division key 2 causes the usual dividing operations during which the pin carriage is tabulated with the divisor entered therein to move from the initial zero position to successive ordinal positions. When the pin carriage arrives in the seventh ordinal position, bracket 16 is engaged by stop portion 19 so that pin carriage 10, which is moved to the left by a conventional spring, not shown, is stopped in the seventh ordinal position. Consequently, the repeated subtraction operations forming the division are carried out starting with the seventh order which is entirely sufficient since the dividend has less than seven orders.

During the step of the pin carriage from the sixth ordinal position to the seventh ordinal position, bracket 16 engages camming face 42b, as explained with reference to FIG. 3, and turns coupling means 40 to the position in FIG. 5. However, the displaced position of coupling means 40 has no influence on the dividing operations, since the pin carriage is prevented by stop portion 19 from moving beyond the seventh ordinal position.

When coupling means 40 is turned to the position shown in FIG. 5 it is locked in this position by locking means 53 and then released upon operation of the total key 5, as explained above.

When pin carriage 10 is moved to the right as viewed in FIG. 8 by the drive means of the calculator, it is moved beyond the 0 position to a position in which bracket 16 is in the position UW. During this movement, bracket 16 engages camming edge 34 and, sliding along the same, turns catch 28 from the position of FIG. 8 to the position of FIG. 2, permitting spring 31 to return stop lever 18 to the inoperative position shown in FIG.

4 in which catch 28 is held by shoulder 22. All parts of the apparatus are now again in the initial position.

It will be understood that the apparatus of the invention obtains the effect that the pin carriage moves to the highest ordinal end position if the dividend has an order number greater than seven, and moves only to the seventh ordinal position if the dividend has a smaller number of orders than seven. If the dividend has, for example eight or nine orders, the pin carriage moves nevertheless to the last ordinal position, which may be the eleventh or twelfth order, and some unnecessary operations of the pin carriage take place. This, however, is acceptable since divisions with dividends having a number of orders greater than seven, do not frequently occur in the usual office practice. On the other hand, if the dividend has fewer orders than seven, a great deal of time is saved since the pin carriage does not have to move to the ordinal end position during the division, but starts the division with the seventh order which is, of course, sufficient for dividends having a number of orders smaller than seven.

It will be appreciated that the seventh order has been selected in the above example of a practical embodiment of the invention as an order number suitable for the particular calculator which may have eleven orders and for the particular divisions carried out in offices for which the calculator is intended.

However, any other intermediate order between the highest order and the lowest order for which the calculator is designed may be selected, so that the pin carriage will not move beyond a selected intermediate ordinal position if the dividend has a corresponding small number of orders. The intermediate ordinal position, for example the seventh ordinal position of the pin carriage, is selected by placing control portion 42 and stop portion 19 in the respective region, and if, for example the pin carriage is to be stopped in the eighth order position, wall 41 and stop lever 18 are made longer so that control portion 42 and stop portions 19 are located in the region in which brackets 16 is when the pin carriage 10 is in the eighth position.

It will be understood that each of the elements described above, or two or more together, may also find a useful application in other types of calculators differing from the types described above.

While the invention has been illustrated and described as embodied in an apparatus for preventing movement of a pin carriage to the highest ordinal position during a division if the dividend has a small number of orders it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a calculator, in combination, input storage means movable along a path from an initial position to a plurality of ordinal positions including an end position corresponding to the highest order, and a selected intermediate ordinal position, said input storage means being operable to move to said end position during dividing operations; stop means for stopping said input storage means in said intermediate ordinal position and having a normal inoperative position and a stop position; actuating means for moving said stop means to said stop position, and for starting said dividing operations of said input storage means; and coupling means having an inoperative position, and a normal coupling position for operatively connecting said actuating means with said stop means, said coupling means being located in said path of movement of said input storage means in the region of said intermediate ordinal position of the same and being moved to said inoperative position by said input storage means in said intermediate ordinal position whereby operation of said actuating means causes stopping of said input storage means by said stop means during dividing operations in said intermediate ordinal position only if a number entered into said input storage means has a smaller number of orders than represented by said input storage means in said intermediate ordinal position.

2. In a calculator, in combination, input storage means movable along a path from an initial position to a plurality of ordinal positions including an end position corresponding to the highest order, and a selected intermediate ordinal position, said input storage means being operable to successively move to said ordinal positions upon entry therein of a number representing a dividend and to move to said end position during dividing operations; stop means for stopping said input storage means in said intermediate ordinal position and having a normal inoperative position and a stop position; a division key for moving said stop means to said stop position and for starting said dividing operations of said input storage means including movement of the same along said path; and coupling means having an inoperative position, and a normal coupling position for operatively connecting said division key with said stop means, said coupling means being located in said path of movement of said input storage means in the region of said intermediate ordinal position of the same and being moved to said inoperative position by said input storage means arriving at said intermediate ordinal position during entry of a dividend having at least the number of orders represented by said intermediate ordinal position whereby operation of said division key causes stopping of said input storage means in said intermediate ordinal position by said stop means during dividing operations only if the dividend has a smaller number of orders than represented by said input storage means in said intermediate ordinal position.

3. An apparatus according to claim 2 and including a total key operatively connected with said coupling means for causing movement of the same from said inoperative position to said coupling position.

4. An apparatus according to claim 2 wherein said input storage means is a pin carriage having a projecting portion moving along said path, and wherein said stop means includes a stop portion located in said path of said portion of said pin carriage.

5. In a calculator, in combination, input storage means movable along a path from an initial position to a plurality of ordinal positions including an end position corresponding to the highest order, and a selected intermediate ordinal position, said input storage means being operable to successively move to said ordinal positions upon entry therein of a number prepresenting a dividend and to move to said end position during dividing operations; stop means for stopping said input storage means in said intermediate ordinal position and having a normal inoperative position and a stop position; a division key for moving said stop means to said stop position and for starting said dividing opeartions of said input storage means including movement of the same along said path; and coupling means supporting said stop means for movement between said inoperative and stop positions, and having an inoperative position and a normal coupling position for placing said stop means in the path of movement of said division key so that the latter moves said stop means to said stop position where actuated, said coupling means being located in said path of movement of said input storage means in the region of said intermediate ordinal position of the same and being moved to said inoperative position by said input storage means arriving at said intermediate ordinal position during entry of a dividend having at least the number of orders represented by said intermediate ordinal position whereby operation of said division key causes stopping of said input storage means in said intermediate ordinal position by said stop means during dividing operations only if the dividend has a smaller number of orders than represented by said input storage means in said intermediate ordinal position.

6. An apparatus according to claim 5 including locking means for locking said coupling means in said inoperative position; biasing means for urging said coupling means to said coupling position; releasing means for moving said locking means to a position releasing said coupling means; and a total key for actuating said releasing means.

7. An apparatus according to claim 5 wherein said stop means includes a stop lever mounted for turning movement on said coupling means and having a stop portion located in said stop position in the path of movement of said input storage means, and a coupling portion located in the path of movement of said division key only in said coupling position of said coupling means.

8. An apparatus according to claim 5 and including a stationary shaft supporting said coupling means for turning movement between said coupling and inoperative positions, the axis of said shaft extending parallel to said path of said input storage means.

9. An apparatus according to claim 5 including a support for mounting said coupling means turnable about an axis parallel to said path of said input storage means; and wherein said coupling means includes a camming face located in the path of movement of said input storage means in the region of said intermediate ordinal position of the same so that upon engagement of said pin carriage with said camming face, said coupling means is turned from said coupling position to said inoperative position.

10. An apparatus according to claim 5 wherein said coupling means is mounted for turning movement about an axis parallel to said path of said input storage means; and wherein said stop means includes a stop lever mounted on said coupling means for turning movement about a pivot axis perpendicular to said axis, said stop lever having a stop portion projecting parallel to said pivot axis into the path of movement of said input storage device in said stop position of said stop means, and a coupling portion located in the path of movement of said division key so that upon operation of said division key said stop lever is turned for placing said stop portion in the path of movement of said input storage means while said coupling means is in said coupling position.

11. An apparatus according to claim 10 wherein said coupling means has a locking portion; and including locking means movable between a locking position for locking said coupling means in said inoperative position, and a releasing position; a spring connecting said locking means with said coupling means and urging the latter into said coupling position; releasing means for moving said locking means to said releasing position; and a total key cooperating said releasing means.

12. An apparatus according to claim 5 wherein said stop means includes a stop lever mounted on said coupling means for turning movement between said inoperative position and said stop position; and including a catch mounted on said coupling means for angular movement between a position arresting said stop lever in said stop position, and a position permitting movement of said stop lever from said inoperative position to said stop position, and a spring connecting said stop lever with said catch and urging the latter to move to said arresting position, said stop lever having a shoulder for holding said catch against the action of said spring while said stop lever is in said inoperative position.

13. An apparatus according to claim 12, wherein said input storage means is movable in a direction from higher ordinal positions to lower ordinal positions beyond the ordinal position associated with the unit order to a restoring position, said catch having a portion located in the path of movement of said input storage means into said restoring position so that said catch is moved out of said arresting position permitting said spring to move said stop lever from said stop position to said inoperative position.

14. An apparatus according to claim 13 wherein said catch is an angular lever having an arresting portion cooperating with said stop lever, and a lever arm formed with a camming edge located in the path of movement of said input storage means.

15. An apparatus according to claim 5 wherein said input storage means includes a bracket; and wherein said coupling means includes a control portion having a pair of oppositely slanted caming faces located in the path of movement of said bracket during movement of said input storage means in opposite directions along said path whereby upon engagement of said camming faces with said bracket, said coupling means is moved from said coupling position to said inoperative position.

16. An apparatus according to claim 5 including a stationary shaft supporting said coupling means for turning movement about an axis parallel to the path of movement of said input storage means; wherein said coupling means includes a pair of bearing brackets mounted on said shaft, a wall extending parallel to said axis, and having a transverse control portion having a pair of oppositely slanted camming faces; wherein said input storage means is a pin carriage having bearing brackets; and including stationary guide rails for guiding said bearing brackets of said pin carriage; wherein one of said bearing brackets engages said slanted camming faces during movements of said pin carriage in opposite directions along said path; wherein said stop means includes a double-armed stop lever mounted on said wall for turning movement between said inoperative and stop positions, said stop lever having at one end thereof a stop portion projecting into the path of said one bearing bracket of said pin carriage when said stop means is in said stop position, said stop lever being controlled by said division key to turn upon actuation of said division key from said inoperative position to said stop position only if said coupling means is in said coupling position.

17. An apparatus according to claim 16 and including a catch mounted on said wall of said coupling means for arresting said stop lever in said stop position, and a spring connecting said catch with said stop lever, said catch having a camming face located in the path of movement of said one bearing bracket of said pin carriage and being engaged by the same during a return movement of said pin carriage to release said stop lever so that the same is urged by said spring into said inoperative position.

18. An apparatus according to claim 17 including a supporting pin; a locking means having a cutout receiving said supporting pin so that said locking means is mounted for turning and translatory movement; a spring connecting said locking means with said coupling means and urging said coupling means to said coupling position, said locking means being operable to lock said coupling in said inoperative position when said coupling means is turned by said one bearing bracket into said inoperative position; and releasing means for shifting said locking means in said translatory movement to a releasing position in which said spring causes relative turning between said locking means and said coupling means whereby said coupling means is released to be returned to said coupling position by said last mentioned spring.

19. An apparatus according to claim 18 wherein said releasing means is an angular lever pivotally connected with said locking means; and including a total key for turning said angular lever to a position causing translatory movement of said locking means for releasing said coupling means.

20. An apparatus according to claim 16 wherein said control portion of said coupling means includes a straight face between said camming faces, said straight face extending parallel to said path of said pin carriage and being engaged by said one bearing bracket of said pin carriage when the latter is in said selected intermediate ordinal position whereby said coupling means is held by said one bearing bracket in said inoperative position while said pin carriage is in said intermediate ordinal position.

References Cited by the Examiner

UNITED STATES PATENTS

| | | | |
|---|---|---|---|
| 2,200,588 | 5/1940 | Avery | 235—63.22 |
| 2,653,763 | 9/1953 | Hopkins | 235—63.22 |
| 2,653,765 | 9/1953 | Machods et al. | 235—63.221 |
| 2,722,377 | 11/1955 | Davis | 235—63.221 |
| 2,821,342 | 1/1958 | Capellaro | 235—63.221 |
| 2,864,559 | 12/1958 | Ellerbeck | 235—63.221 |
| 3,140,823 | 7/1964 | Kuhn | 235—60 |

LOUIS J. CAPOZI, *Primary Examiner.*